US012637134B2

(12) United States Patent
Lee

(10) Patent No.: US 12,637,134 B2
(45) Date of Patent: May 26, 2026

(54) ELECTRIC POWER STEERING APPARATUS

(71) Applicant: AMA Tech Corp., New Taipei City (TW)

(72) Inventor: Mao-Tu Lee, New Taipei City (TW)

(73) Assignee: AMA Tech Corp., New Taipei City (TW)

( * ) Notice: Subject to any disclaimer, the term of this patent is extended or adjusted under 35 U.S.C. 154(b) by 413 days.

(21) Appl. No.: 18/495,822

(22) Filed: Oct. 27, 2023

(65) Prior Publication Data

US 2024/0140522 A1 May 2, 2024

(30) Foreign Application Priority Data

Oct. 31, 2022 (TW) ................................... 111211870

(51) Int. Cl.
*B62D 5/04* (2006.01)
(52) U.S. Cl.
CPC ......... *B62D 5/0445* (2013.01); *B62D 5/0427* (2013.01)
(58) Field of Classification Search
CPC ............................. B62D 5/0445; B62D 5/0427
See application file for complete search history.

(56) References Cited

U.S. PATENT DOCUMENTS

| | | | | |
|---|---|---|---|---|
| 4,842,090 A * | 6/1989 | Shimizu | ............... | B62D 5/0424 180/413 |
| 2002/0189891 A1 * | 12/2002 | Tatewaki | ............. | B62D 5/0424 180/444 |
| 2005/0121251 A1 * | 6/2005 | Ueno | .................... | B62D 5/0409 180/444 |
| 2013/0180794 A1 * | 7/2013 | Shiino | .................. | B62D 5/0409 180/444 |
| 2013/0257193 A1 * | 10/2013 | Toda | ....................... | H02K 11/33 310/52 |
| 2016/0094104 A1 * | 3/2016 | Yamasaki | .............. | H02K 11/33 310/68 D |
| 2016/0218596 A1 * | 7/2016 | Hayashi | .................. | H02K 11/33 |
| 2016/0329781 A1 * | 11/2016 | Onishi | ................... | H02K 11/33 |
| 2020/0088553 A1 * | 3/2020 | Kimoto | ................. | G01D 11/245 |
| 2022/0332360 A1 * | 10/2022 | Enomoto | ............ | F16H 25/2214 |
| 2023/0081123 A1 * | 3/2023 | Morimoto | .............. | H02K 11/02 310/71 |
| 2023/0179070 A1 * | 6/2023 | Morimoto | .............. | H02K 11/33 310/64 |

* cited by examiner

*Primary Examiner* — Long T Tran
(74) *Attorney, Agent, or Firm* — Wang Law Firm, Inc.

(57) ABSTRACT

An electric power steering apparatus is provided, including a casing; a steering shaft, disposed in the casing in an axially reciprocal manner and extending from two ends of the casing, and the body thereof having a rack portion and a screw portion; a planetary roller nut, assembled in the casing and screwed to the screw portion; a motor, controlled by the ECU, disposed in the casing, and having an external rotor, and the external rotor being coupled to the planetary roller nut to drive the motor to rotate, further driving the steering shaft to reciprocate in the casing; a first waterproof ring, provided between the planetary roller nut and the casing, and a second waterproof ring, placed between the planetary roller nut and the hollow stator of the motor, thus forming an airtight and waterproof efficacy for the motor to prevent the motor from losing power.

5 Claims, 6 Drawing Sheets

ELECTRIC POWER STEERING APPARATUS

CROSS-REFERENCE TO RELATED APPLICATION

This application claims priority from Taiwan Patent Application No. 111211870, filed on Oct. 31, 2022, in the Taiwan Intellectual Property Office, the content of which is hereby incorporated by reference in its entirety for all purposes.

BACKGROUND OF THE INVENTION

1. Field of the Invention

The present disclosure relates to an electric power steering apparatus, particularly an RD-type EPS (rack-direct-drive type electric power steering) design that uses an external rotating motor to provide a direct driving force to propel the planetary roller nut to drive the steering shaft.

2. Description of the Related Art

The electric power steering (EPS) system is a power steering system that provides auxiliary torque through a motor. Compared with the traditional hydraulic power steering system, the electric power steering system can adjust the rotation speed of the motor when the vehicle speed changes to provide optimal power steering while striking a balance between convenience at a low speed and stability at a high speed. In addition, the removal of components such as oil pumps and hydraulic oil pipes makes it easier to match different models of vehicles. With the introduction of an advanced driver assistance system (ADAS) and unmanned automatic driving technology, the steering wheel and steering column have gradually become unnecessary components. Therefore, reducing the volume of the electric power steering mechanism and saving costs have become a problem that requires solving.

Moreover, to match different models of vehicles, developers are also dedicated to reducing the number of components in the deceleration mechanism and transmission mechanism, so as to avoid errors such as component deterioration or interference and gaps between components, further affecting the reliability of the calculation of the turning angle of the vehicle body or the position of the output shaft. The electric power steering of the RD-type EPS is better able to meet the requirement of reducing the space of mechanical components. However, the driving motor applied in the electric power steering of the RD-type EPS is a hollow internal-rotating motor, such as the patent application titled "ELECTRIC POWER STEERING SYSTEM" disclosed in No. M590555 in the Taiwan Patent. The motor adopts the form of an internal-rotating rotor, making it impossible to set the number of poles in the structural size of the motor. Nevertheless, a motor with fewer poles has the characteristics of high rotation speed and low torque, making it easy to have a phenomenon of control point deviation when directly driving the ball nuts of the steering shaft that requires sensitive control with high precision. Also, for the ball nuts controlling a steering shaft, due to the structure of the ball nuts themselves, the lead cannot be refined and reduced, resulting in a limitation to the overall control accuracy of the electric power steering. This could lead to significant concerns about the safety of the maneuvering control of a vehicle in automatic driving mode. Furthermore, the installation position of the electric power steering is located at the bottom of the vehicle engine, which is susceptible to water splashing or soaking when the vehicle travels through waterlogged terrain, resulting in a high probability of motor damage and failure.

In this view, on the basis of the electric power steering of the conventional RD-type EPS still having room for improvement, the inventor of the present disclosure proposes the electric power steering apparatus of the present disclosure that particularly adopts an external rotating motor in conjunction with a planetary roller nut to achieve efficient and precise power output; meanwhile, an innovative design is proposed for the waterproof structure of the motor to achieve a product safety design that prevents the motor from soaking in water.

SUMMARY OF THE INVENTION

The purpose of the present disclosure is to provide an electric power steering apparatus, so that the motor of the electric power steering may achieve waterproofing and prevent failure in order to solve the aforementioned problems.

To achieve the aforementioned purposes, the electric power steering apparatus of the present disclosure, with a preferable technical solution, includes a casing, a steering shaft, a planetary roller nut, and a motor, wherein:

The casing has a first casing and a second casing, and the first casing is a hollow tubular body; the second casing is a hollow tubular body with multi-order tube diameters, an accommodating space is formed inside one end of a larger tube diameter of the second casing, and a first waterproof ring is embedded at a selected position inside the accommodating space.

The steering shaft is disposed in the casing in an axially reciprocal manner, two ends thereof respectively extend from the first casing and the second casing, and a body of the steering shaft has a rack portion and a screw portion;

the planetary roller nut is assembled in the casing and screwed to the screw portion of the steering shaft, the planetary roller nut is supported and accommodated in the accommodating space of the second casing through a bearing, and the planetary roller nut and the first waterproof ring are matched with each other; the planetary roller nut is provided with a driver flange on one side end, and a second waterproof ring is embedded in a center of an outer end of the driver flange.

The motor is disposed in the second casing; the motor has a hollow-shaped motor stator and an external rotor, and the motor stator is assembled with a set of coils pierced through by a hollow seat tube; the motor stator allows the steering shaft to pass through the hollow seat tube, and the hollow seat tube of the motor stator and the second waterproof ring are matched with each other; one end of the external rotor is coupled to the planetary roller nut to drive the planetary roller nut to rotate, further driving the steering shaft to axially reciprocate within the casing.

In the aforementioned electric power steering apparatus, the planetary roller nut is provided with a plurality of locking holes on an outer ring of the driver flange for the motor to interlock.

In the aforementioned electric power steering apparatus, an axial length of the hollow seat tube is greater than that of the coil.

In the aforementioned electric power steering apparatus, the external rotor is roughly a cup shape, and a plurality of through holes are provided at a bottom of the external rotor with a cup shape.

In the aforementioned electric power steering apparatus, the plurality of through holes correspond to a plurality of locking holes of the driver flange of the planetary roller nut.

DESCRIPTION OF THE PREFERRED EMBODIMENTS

The structural features and other functions and purposes of the present disclosure are described in detail as follows:

Particularly, the terms "first" and "second" are used for descriptive purposes only and cannot be construed as indicating or implying relative importance or implicitly specifying the number of technical features.

Figure 1:
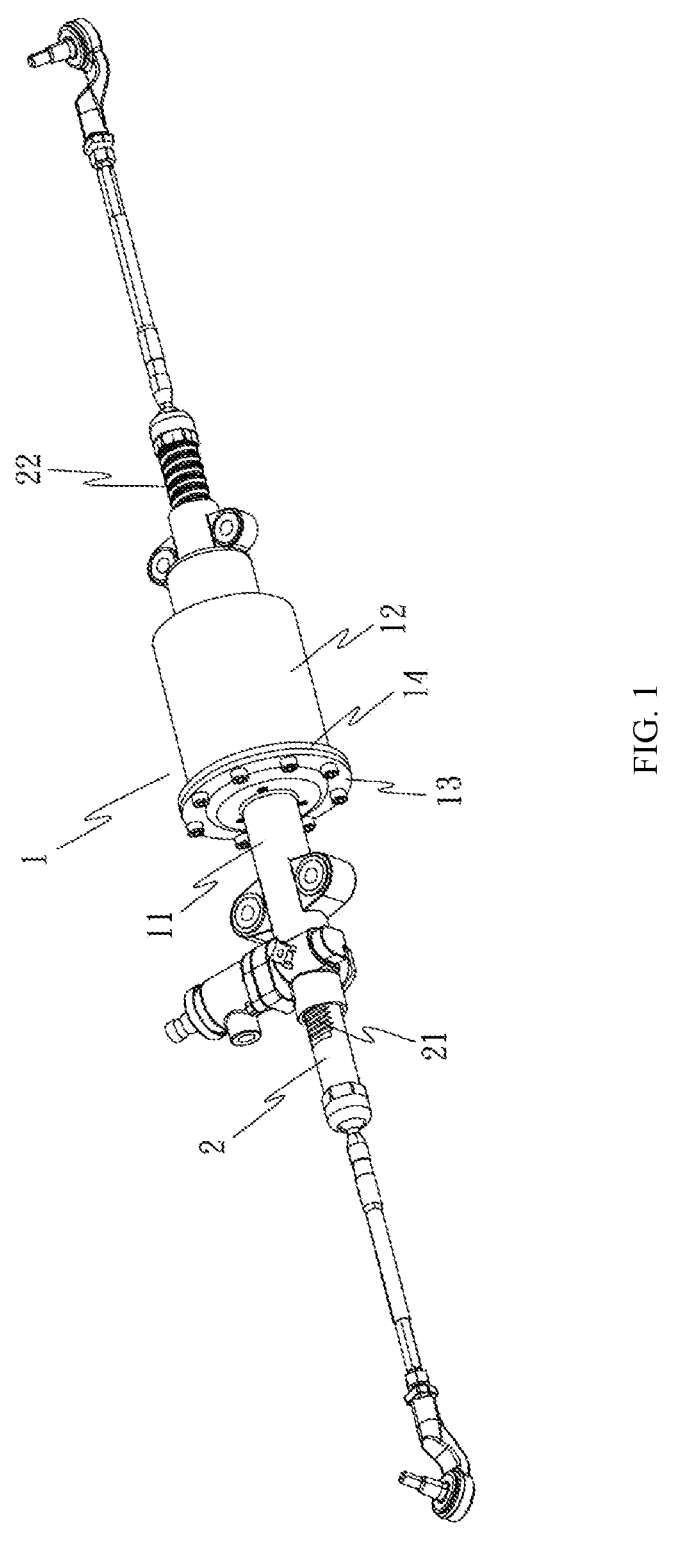
FIG. 1 is a schematic diagram of the three-dimensional appearance of the electric power steering apparatus according to the present disclosure.
Figure 2:
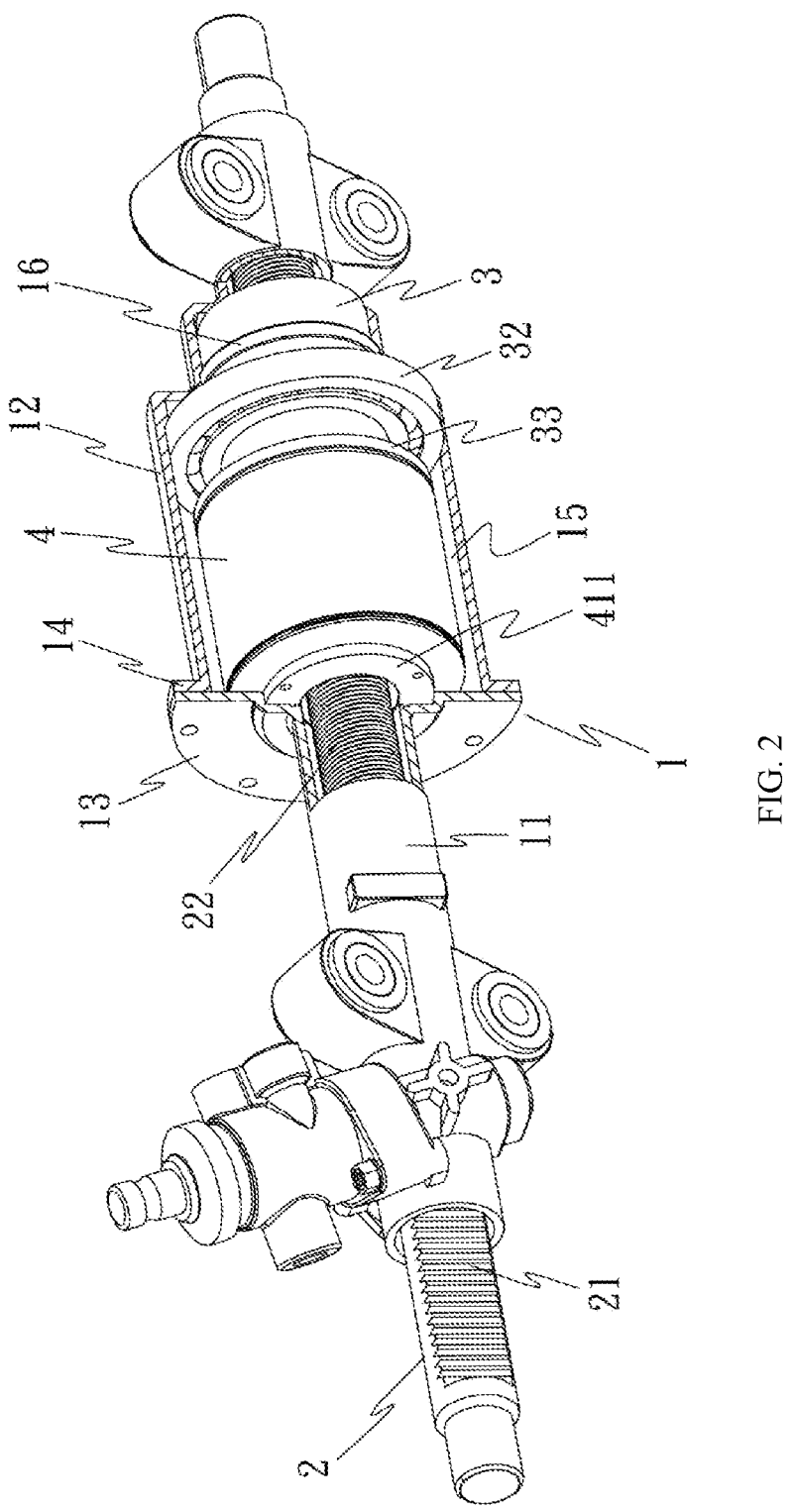
FIG. 2 is a schematic diagram of the three-dimensional assembling section of the electric power steering apparatus according to the present disclosure.
Figure 3:
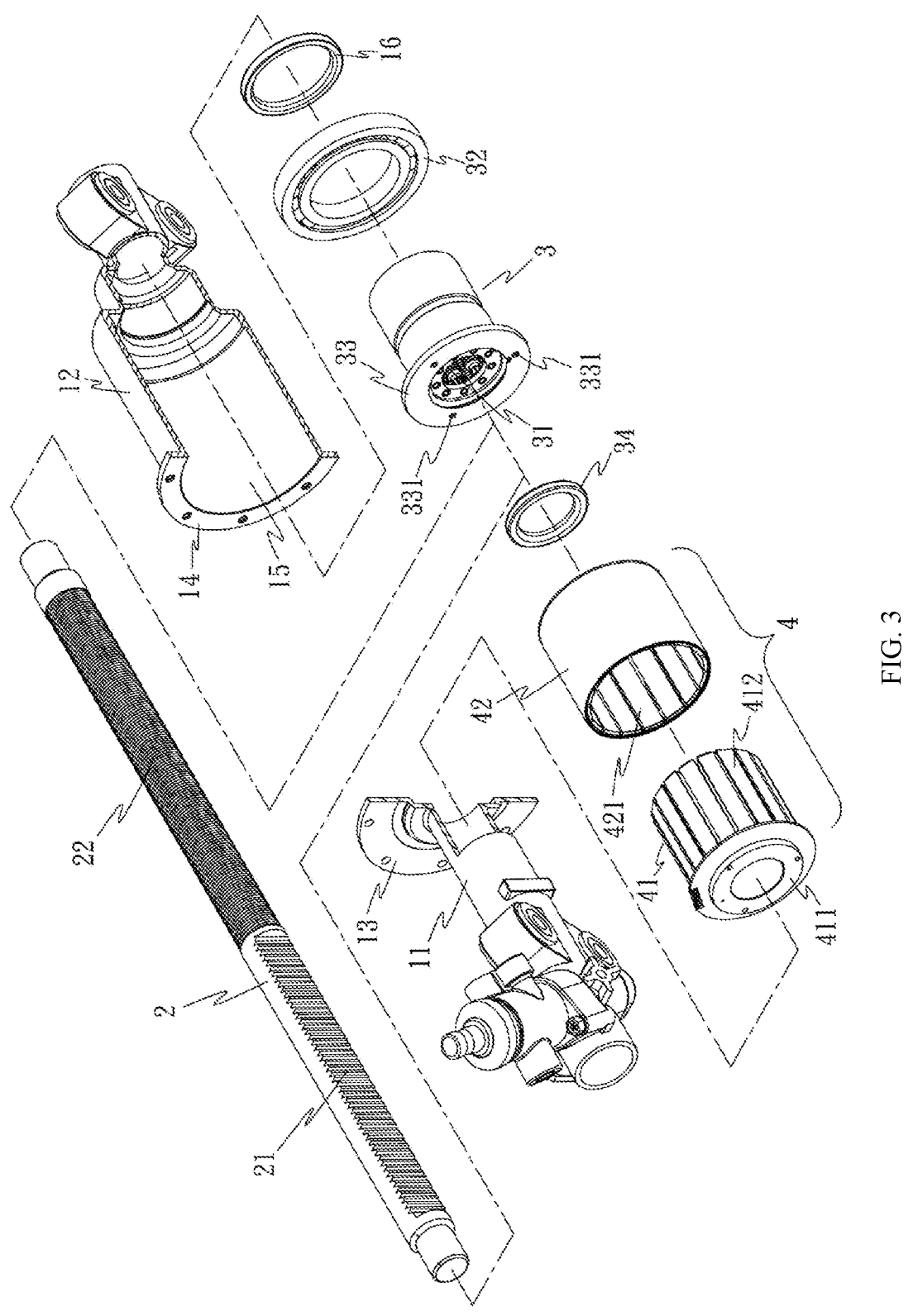
FIG. 3 is an exploded three-dimensional schematic diagram of the electric power steering apparatus according to the present disclosure.

Referring to FIG. 1, FIG. 2, and FIG. 3, the electric power steering apparatus of the present disclosure is an RD-type EPS (rack-direct-drive type electric power steering) apparatus in which an external rotating motor provides a direct driving force to propel a nut to drive a steering shaft. A preferable specific embodiment includes a casing 1, a steering shaft 2, a planetary roller nut 3, and a motor 4, wherein:

The casing 1 includes a first casing 11 and a second casing 12, the first casing 11 is a hollow tubular body, a first flange 13 is formed on the outer edge of the nozzle at one end of the hollow tubular body, and the first flange 13 is provided for the motor 4 for fixation. The second casing 12 is a hollow tubular body with multi-order tube diameters, a second flange 14 is formed on the outer edge of the nozzle at one end of the larger diameter of the hollow tubular body, making the second flange 14 locked relative to the first flange 13. An accommodating space 15 is formed inside one end of the larger diameter of the hollow tubular body, the accommodating space 15 is provided for the planetary roller nut 3 and the motor 4 for accommodation, a first waterproof ring 16 is embedded at a selected position inside the accommodating space 15, making the first waterproof ring 16 and the planetary roller nut 3 form a sleeved waterproof structure.

The steering shaft 2 is disposed in the casing 1 in an axially reciprocal manner (as shown in FIG. 2 and FIG. 3), two ends thereof respectively extend from the first casing 11 and the second casing 12, and a body of the steering shaft 2 has a rack portion 21 and a screw portion 22.

Figure 4:
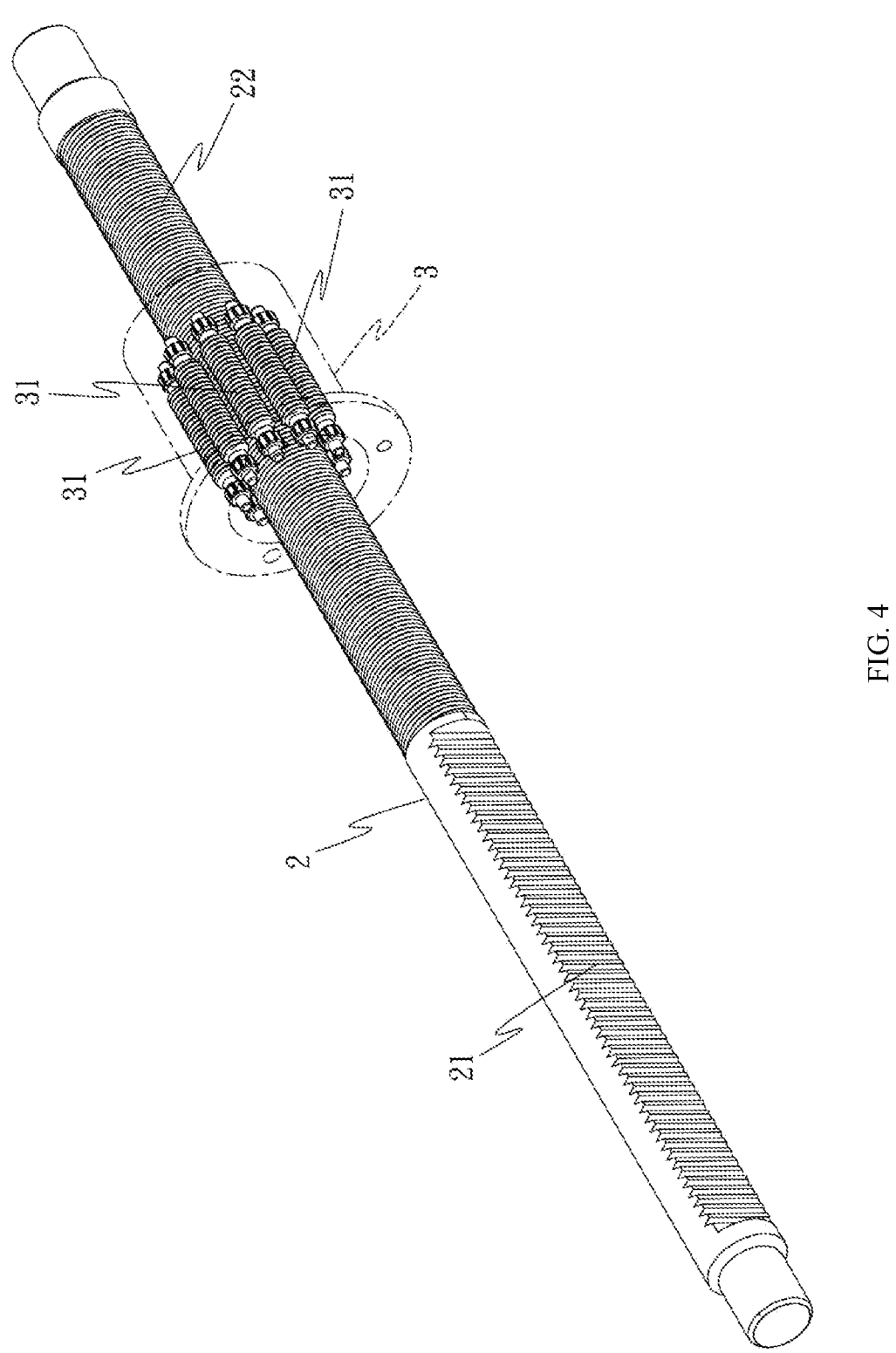
FIG. 4 is a three-dimensional perspective assembling schematic diagram of the steering shaft and the planetary roller nut in the electric power steering apparatus according to the present disclosure.

The planetary roller nut 3 is assembled in the casing 1 and screwed to the screw portion 22 of the steering shaft 2, which is mainly screwed to the steering shaft 2 by the plurality of planetary rollers 31 in the planetary roller nut 3 to provide linear propelling efficacy (please refer to FIG. 4). The planetary roller nut 3 of the present disclosure is supported and accommodated in the accommodating space 15 of the second casing 12 through a bearing 32, and the planetary roller nut 3 and the first waterproof ring 16 are matched with each other. The planetary roller nut 3 is provided with a driver flange 33 on one side end, a plurality of locking holes 331 are provided on the outer ring of the driver flange 33, the plurality of locking holes 331 are provided for the motor 4 for interlocking, and a second waterproof ring 34 is embedded in the center of the outer end of the driver flange 33.

Figure 5:
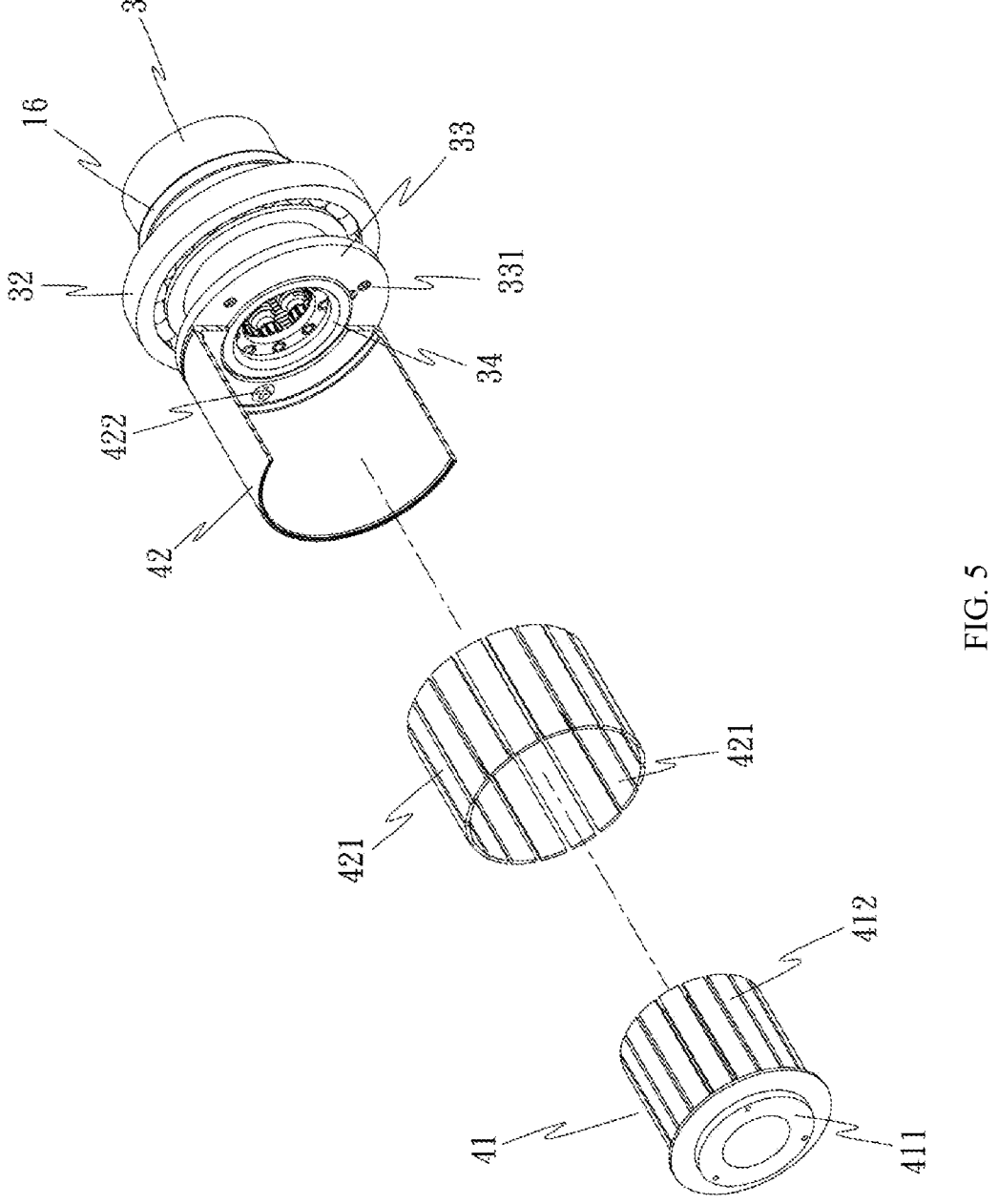
FIG. 5 is a partially exploded three-dimensional schematic diagram of the motor of the electric power steering apparatus according to the present disclosure.

The motor 4 is disposed in the casing 1 and controlled by the engine control unit (ECU), further driving the rotation of the planetary roller nut 3, so as to drive the steering shaft 2 to axially reciprocate within the casing. The motor 4 is in a form of a hollow motor, which is formed of a hollow motor stator 41 and an external rotor 42. Referring to FIG. 5, the motor stator 41 is assembled with a set of coils 412 pierced through by a hollow seat tube 411, the axial length of the hollow seat tube 411 is greater than that of the coil 412, the motor stator 41 in a hollow shape allows the steering shaft 2 to pass through the inside of the hollow seat tube 411, making the motor 4 form a structure sleeved on the steering shaft 2 to drive. The external rotor 42 adopts a multi-pole design, being roughly a cup shape, and a plurality of inductive magnets 421 are combined on the radially inner wall of the external rotor 42. A plurality of through holes 422 are provided at the bottom of the external rotor 42 with a cup shape, and the plurality of through holes 422 correspond to a plurality of locking holes 331 of the driver flange 33 of the planetary roller nut 3 for the external rotor 42 to be locked with the planetary roller nut 3, further making the external rotor 42 drive the planetary roller nut 3 to rotate.

Figure 6:
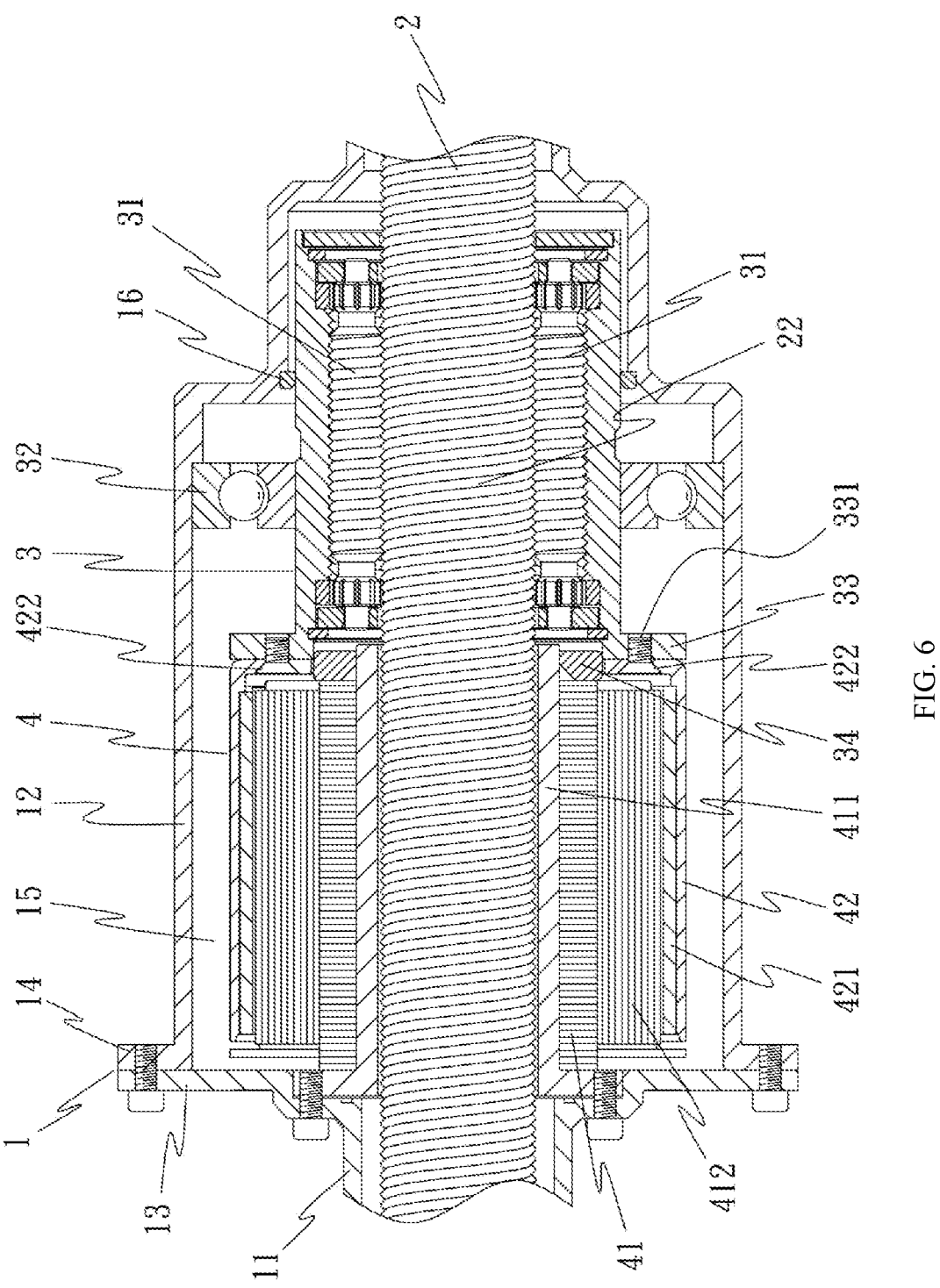
FIG. 6 is a schematic diagram of the assembling section of the electric power steering apparatus according to the present disclosure.

As shown in FIG. 6, with the use of the aforementioned members, the present disclosure first makes the external rotor 42 of the motor 4 locked to the driver flange 33 of the planetary roller nut 3, and then makes the planetary roller nut 3 sleeved on the bearing 32, which, together with the external rotor 42, is placed into the accommodating space 15 of the second casing 12. The planetary roller nut 3 and the first waterproof ring 16 are matched with each other, making the planetary roller 31 of the planetary roller nut 3 screwed into the screw portion 22 of the steering shaft 2, so that the planetary roller nut 3 is able to rotate in the bearing 32. The motor stator 41 is locked on the first flange 13 of the first housing 11, making the first housing 11 together with the motor stator 41 sleeved behind the rack portion 21 of the steering shaft 2; the first flange 13 of the first casing 11 is locked relative to the second flange 14 of the second casing 12, making the motor stator 41 of the motor 4 sleeved and assembled together with the external rotor 42. Meanwhile, the hollow seat tube 411 of the motor stator 41 and the second waterproof ring 34 embedded in the planetary roller nut 3 are matched with each other. The electric power steering apparatus of the present disclosure is able to make the overall structure more streamlined, and the airtight and waterproof of the motor 4 may be guaranteed, effectively preventing the chance of motor damage due to water immersion.

Since the rolling driving component used for the planetary roller nut 3 is the planetary roller 31, it has a greater loading capacity and a longer service life with a shorter lead time compared with balls used in traditional ball nut rolling components. Moreover, the planetary roller nut 3 may achieve a faster rotation speed than the ball nut and a lower noise level without the need for a reflux device. Therefore, the electric power steering apparatus of the present disclosure adopts the planetary roller nut 3 as the transmission component of the steering shaft 2 and has the following advantages: The steering shaft 2 has a faster and more precise driving stroke and is more capable of withstanding impacts, ensuring the sensitivity, accuracy, safety, and stability of vehicles when being driven.

For the electric power steering apparatus of the present disclosure assembled according to the aforementioned structure, owing to the motor 4 requiring being waterproof, in addition to a part in the gap between the hollow seat tube 411 and the steering shaft 2, the other part is positioned in the gap between the planetary roller nut 3 and the second casing 12. The waterproofing of the gap between the hollow seat tube 411 and the steering shaft 2 is achieved by fitting the second waterproof ring 34 of the planetary roller nut 3 to the tail end diameter of the hollow seat tube 411 tightly. The waterproof structure of the gap between the planetary roller nut 3 and the second casing 12 is achieved by the first waterproof ring 16 disposed between the planetary roller nut 3 and the second casing 12. Through the functions of the first waterproof ring 16 and the second waterproof ring 34 of the aforementioned two waterproof structures, water prevention may be reached for the motor 4.

In summary, the electric power steering apparatus of the present disclosure has made sure that the motor power of electric power steering may be fully utilized, making the motor as a whole airtight and waterproof completely. Moreover, the efficacy and the purpose of the design are evidently confirmed, which has been deemed reasonable and progressive. To this end, a patent application is applied in accordance with the law, with the hope to ask for a detailed review and comprehensive consideration for the granting of the patent application.

What is claimed is:

1. An electric power steering apparatus, comprising a casing, a steering shaft, a planetary roller nut, and a motor, wherein:

the casing, having a first casing and a second casing, the first casing being a hollow tubular body; the second casing being a hollow tubular body with multi-order tube diameters, an accommodating space being formed inside one end of a larger tube diameter of the second casing, and a first waterproof ring being embedded at a selected position inside the accommodating space;

the steering shaft, disposed in the casing in an axially reciprocal manner, two ends thereof respectively extending from the first casing and the second casing, and a body of the steering shaft having a rack portion and a screw portion;

the planetary roller nut, assembled in the casing and screwed to the screw portion of the steering shaft, the planetary roller nut being supported and accommodated in the accommodating space of the second casing through a bearing, and the planetary roller nut and the first waterproof ring being matched with each other; the planetary roller nut being provided with a driver flange on one side end, and a second waterproof ring being embedded in a center of an outer end of the driver flange;

the motor, disposed in the second casing; the motor having a hollow-shaped motor stator and an external rotor, and the motor stator being assembled with a set of coils pierced through by a hollow seat tube; the motor stator allowing the steering shaft to pass through the hollow seat tube, and the hollow seat tube of the motor stator and the second waterproof ring being matched with each other; one end of the external rotor being coupled to the planetary roller nut to drive the planetary roller nut to rotate, further driving the steering shaft to axially reciprocate within the casing.

2. The electric power steering apparatus according to claim 1, wherein the planetary roller nut is provided with a plurality of locking holes on an outer ring of the driver flange for the motor to interlock.

3. The electric power steering apparatus according to claim 1, wherein an axial length of the hollow seat tube is greater than that of the coil.

4. The electric power steering apparatus according to claim 1, wherein the external rotor is roughly a cup shape, and a plurality of through holes are provided at a bottom of the external rotor with a cup shape.

5. The electric power steering apparatus according to claim 4, wherein the plurality of through holes correspond to a plurality of locking holes of the driver flange of the planetary roller nut.

\* \* \* \* \*